United States Patent
Ye et al.

(10) Patent No.: US 11,515,944 B2
(45) Date of Patent: Nov. 29, 2022

(54) DEVICES, METHODS, APPARATUSES AND COMPUTER READABLE STORAGE MEDIA FOR OPTICAL COMMUNICATION

(71) Applicant: Nokia Solutions and Networks Oy, Espoo (FI)

(72) Inventors: Chenhui Ye, Shanghai (CN); Dongxu Zhang, Shanghai (CN); Dan Geng, Shanghai (CN); Werner Van Hoof, Aartselaar (BE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/488,918

(22) Filed: Sep. 29, 2021

(65) Prior Publication Data

US 2022/0103260 A1    Mar. 31, 2022

(30) Foreign Application Priority Data

Sep. 30, 2020 (CN) .......................... 202011059547.0

(51) Int. Cl.
*H04Q 11/00* (2006.01)
*H04B 10/27* (2013.01)

(52) U.S. Cl.
CPC ......... *H04B 10/27* (2013.01); *H04Q 11/0062* (2013.01); *H04Q 2011/0079* (2013.01); *H04Q 2011/0086* (2013.01)

(58) Field of Classification Search
CPC ................................................. H04Q 11/0067
See application file for complete search history.

(56) References Cited

U.S. PATENT DOCUMENTS

| 2019/0089463 A1* | 3/2019 | Zhang | H04B 10/27 |
| 2021/0194588 A1* | 6/2021 | Wu | H04Q 11/0067 |
| 2021/0250096 A1* | 8/2021 | Zhou | H04Q 11/0067 |

FOREIGN PATENT DOCUMENTS

EP      2723015 A1    4/2014

OTHER PUBLICATIONS

Search Report dated Feb. 22, 2022 issued in corresponding European patent application No. 21200195.2.

* cited by examiner

*Primary Examiner* — Shi K Li
(74) *Attorney, Agent, or Firm* — Harness, Dickey & Pierce, P.L.C.

(57) ABSTRACT

Embodiments of the present disclosure relate to devices, methods, apparatuses and computer readable storage media of ONU activation for OLT Equalizer training. The method includes determining, at OLT, configuration information indicating a bandwidth allocation dedicated for an ONU and a first target preamble sequence associated with the bandwidth allocation, the first target preamble sequence to be used by the ONU for a transmission from the ONU to the OLT on a first wavelength; transmitting the configuration information to the ONU; and receiving the transmission from the ONU from the ONU on the first wavelength, the transmission is performed by the ONU based on the first target preamble sequence.

17 Claims, 5 Drawing Sheets

DEVICES, METHODS, APPARATUSES AND COMPUTER READABLE STORAGE MEDIA FOR OPTICAL COMMUNICATION

CROSS-REFERENCE TO RELATED APPLICATIONS

This claims priority under 35 U.S.C. § 120 to Chinese Application No. 202011059547.0, filed Sep. 30, 2020, the entire contents of which are hereby incorporated by reference.

FIELD

Embodiments of the present disclosure generally relate to the field of telecommunication and in particular to devices, methods, apparatuses and computer readable storage media for optical communication.

BACKGROUND

For the new generation Passive Optical Network (PON) with at least 50 Gbps-per-wavelength capacity, a digital signal processing (DSP) will be required for physical layer signal equalization to overcome the signal distortion issues caused by high bitrate and imperfect channel condition.

During the activation of the ONU, an initial equalizer training procedure is required for OLT's burst mode receiver, to settle an appropriate set of for the new ONU. Once the equalizer of the burst receiver has been initially trained, the preamble length for upstream burst can be shortened to reduce burst frame overhead.

SUMMARY

In general, example embodiments of the present disclosure provide a solution of ONU activation for OLT Equalizer training.

In a first aspect, there is provided a method for an optical communication. The method comprises determining, at an OLT, configuration information indicating a bandwidth allocation dedicated for an ONU and a first target preamble sequence associated with the bandwidth allocation, the first target preamble sequence being to be used by the ONU for a transmission from the ONU to the OLT on a first wavelength; transmitting the configuration information to the ONU; and receiving the transmission from the ONU from the ONU on the first wavelength, the transmission is performed by the ONU based on the first target preamble sequence.

In a second aspect, there is provided a method for an optical communication. The method comprises receiving, at an ONU and from an OLT, configuration information indicating a bandwidth allocation dedicated for an Optical Network Unit, ONU, and a first target preamble sequence associated with the bandwidth allocation, the first target preamble sequence being to be used by the ONU for a transmission from the ONU to the OLT on a first wavelength; and performing the transmission to the OLT based on the first target preamble sequence on the first wavelength.

In a third aspect, there is provided a device for an optical communication. The device comprises at least one processor; and at least one memory including computer program codes; the at least one memory and the computer program codes are configured to, with the at least one processor, cause the device at least to perform the method of the first aspect.

In a fourth aspect, there is provided a device for an optical communication. The device comprises at least one processor; and at least one memory including computer program codes; the at least one memory and the computer program codes are configured to, with the at least one processor, cause the device at least to perform the method of the second aspect.

In a fifth aspect, there is provided an apparatus comprising means for determining, at an OLT, configuration information indicating a bandwidth allocation dedicated for an ONU and a first target preamble sequence associated with the bandwidth allocation, the first target preamble sequence being to be used by the ONU for a transmission from the ONU to the OLT on a first wavelength; means for transmitting the configuration information to the ONU; and means for receiving the transmission from the ONU from the ONU on the first wavelength, the transmission is performed by the ONU based on the first target preamble sequence.

In a sixth aspect, there is provided an apparatus comprising means for receiving, at an ONU and from an OLT, configuration information indicating a bandwidth allocation dedicated for an Optical Network Unit, ONU, and a first target preamble sequence associated with the bandwidth allocation, the first target preamble sequence being to be used by the ONU for a transmission from the ONU to the OLT on a first wavelength; and means for performing the transmission to the OLT based on the first target preamble sequence on the first wavelength.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

The principles and spirit of the present disclosure will now be described below with reference to several example embodiments shown in the accompanying drawings. It should be understood that these specific embodiments are only described for enabling those skilled in the art to better understand and implement the present disclosure, rather than limiting the scope of the present disclosure in any way.

As used herein, the terms "comprise", "include" and variants thereof are intended to be inclusive, i.e. "including but not limited to". The term "based on" is intended to include "based at least in part on". The term "one embodiment" or "the embodiment" is intended to include "at least one embodiment". The terms "first", "second" and so on can refer to the same or different objects. The following description may also include other explicit and implicit definitions.

As used herein, the term "determine" covers various kinds of actions. For example, "determine" may comprise operation, calculation, processing, deriving, investigation, lookup (e.g., lookup in a table, database or another data structure), ascertaining, etc. In addition, "determine" may comprise receiving (e.g., receiving information), accessing (e.g., accessing data in a memory), etc. Furthermore, "determine" may comprise parsing, choosing, selecting, establishing, etc.

The term "circuitry" used herein refers to one or more or all of the following: (a) hardware-only circuit implementations (such as implementations in only analog and/or digital circuitry); and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions; and (c) hardware circuit(s) and or processor(s), such as a microprocessor(s) or a portion of a microprocessor(s), that requires software (e.g., firmware) for operation, but the software may not be present when it is not needed for operation.

This definition of "circuitry" applies to all use cases of this term in this application (including in any claims). As a further example, the term "circuitry" used herein also covers an implementation of merely a hardware circuit or a processor (or multiple processors), or a portion of a hardware circuit or a processor, and its (or their) accompanying software and/or firmware. The term "circuit" also covers, for example, and if applicable to a particular claim element, a baseband integrated circuit or a processor integrated circuit, or OLT, DPU or similar integrated circuits in other computing devices.

Figure 1:
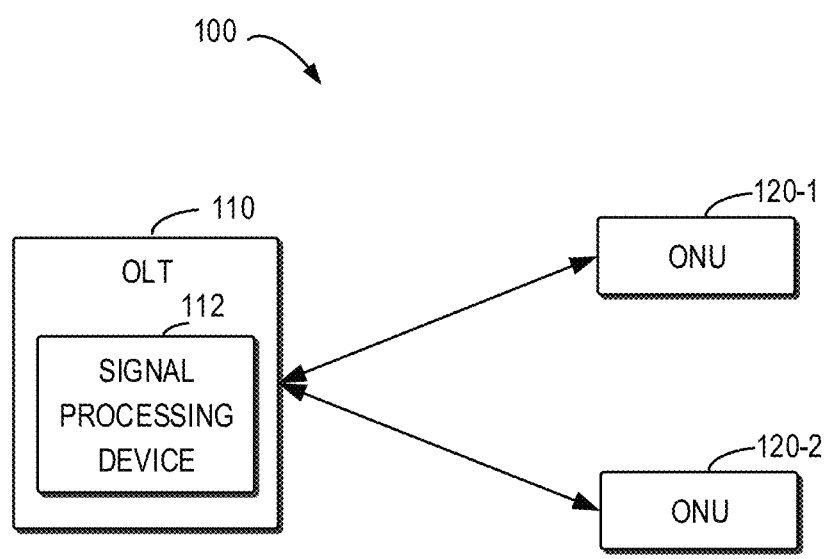
FIG. 1 illustrates an example communication network 100 in which example embodiments of the present disclosure can be implemented.

FIG. 1 is a schematic view of a communication network 100 in which the embodiments described in the present disclosure may be implemented. As shown in FIG. 1, the communication system 100 comprises an OLT 110 and ONUs 120-1 and 120-2 ((hereinafter may also be referred to a ONU 120 collectively.) The OLT 110 may communicate with the ONU 120. For example, data transmission can be performed through an uplink from the ONU 120 to the OLT 110 and also through a downlink from the OLT 110 and the ONU 120. It is to be understood that the number of OLTs and ONUs shown in FIG. 1 is given for the purpose of illustration without suggesting any limitations. The communication network 100 may include any suitable number of OLTs and ONUs.

As shown in FIG. 1, the OLT 110 may comprises a signal processing device 112, which may comprise a photoelectric converter for converting the optical signal to an electrical signal. The signal processing device 112 may also comprise an equalizer, which may recovery an original signal transmitted from the ONU 120 from a distorted signal received at the OLT 110.

For the new generation Passive Optical Network (PON) with at least 50 Gbps-per-wavelength capacity, a digital signal processing (DSP) will be required for physical layer signal equalization to overcome the signal distortion issues caused by high bitrate and imperfect channel condition.

During the activation of the ONU, an initial equalizer training procedure is required for OLT's burst mode receiver, to settle an appropriate set of for the new ONU. Once the equalizer of the burst receiver has been initially trained, the preamble length for upstream burst can be shortened to reduce burst frame overhead.

In the ONU activation procedure of a typical PON system, the OLT periodically sends serial number (SN) requests and suppresses all upstream traffic to create a quiet window for possible newly joined ONUs to respond.

A long preamble sequences may be typically required for the initial equalizer training procedure of the OLT. For higher speed PON (e.g. over 50 Gbps/λ), a longer preamble sequences adds the collision possibility when ONU responds to SN request during activation period. The possibility of ONU activation failure will significantly increase due to added collision. More specifically, the ONU's serial number response may be missed by the OLT due to added collision possibility during the quiet window for serial number grant.

In order to decrease the collision possibility, the quiet window can be enlarged, and the random delay used by ONU during responding to serial number grant can be increased. The increased quiet window for ONU activation wastes system throughput. Compared to previous PON generations, the wasted bandwidth at higher linerate is more significant even if the length of quiet window is unchanged.

Therefore, the present disclosure provides solutions of ONU activation for OLT Equalizer training. In this solution, the OLT may configure a preamble sequence for an upstream transmission from ONU on a common wavelength, which may be used for all ONUs in the system. Once the ONU receives the configuration information associated with preamble sequence, the ONU may perform the upstream transmission to the OLT based on the configured preamble sequence. Based on the configured preamble sequence, the OLT may perform an initial equalizer training to determine a relationship between a distorted signal received from the upstream transmission and an original signal transmitted from the ONU on the common wavelength. In this way, an efficient training at the OLT side and ONU activation quiet window elimination can be achieved at the same time.

Principle and implementations of the present disclosure will be described in detail as below with reference to FIG. 2, which shows a schematic process of ONU activation for OLT Equalizer training. For the purpose of discussion, the process 200 will be described with reference to FIG. 1. The process 200 may involve the OLT 110 and the ONU 120 as illustrated in FIG. 1.

Figure 2:
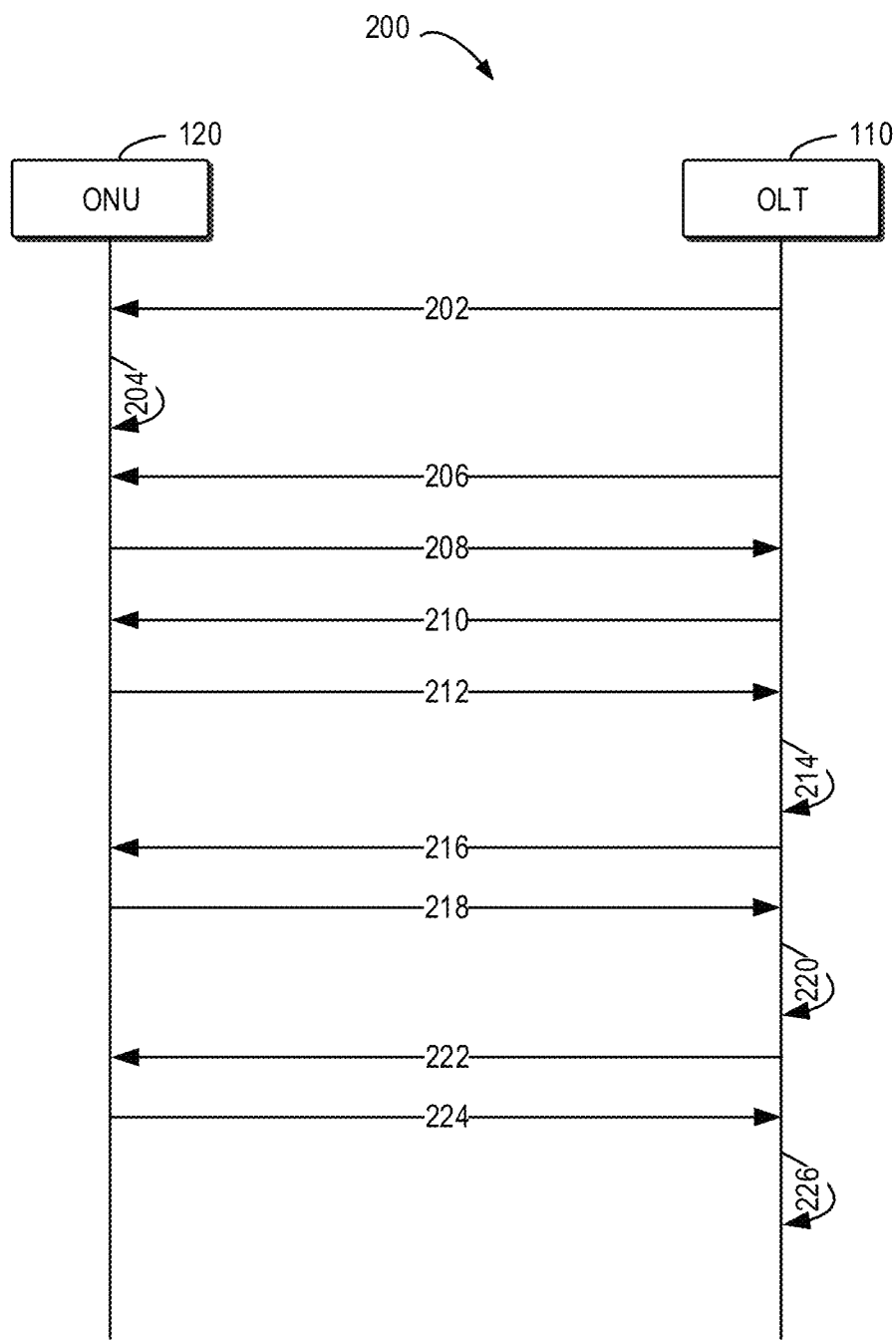
FIG. 2 shows a signaling chart illustrating a process of ONU activation for OLT Equalizer training according to some example embodiments of the present disclosure.

As shown in FIG. 2, on a power-up phase, the OLT 110 may broadcast 202 burst profile information. The burst profile information may be transmitted on a first wavelength, for, example, a common wavelength (working at a high speed, such as 50 Gbps) for all ONUs in the optical network. Furthermore, the burst profile information may be transmitted on a second wavelength, which may be shorter than the common wavelength (working at a lower speed, such as 10 Gbps) and can be considered as a dedicated wavelength for a specific ONU. For either ONU or OLT, all these wavelengths are presented in the same optical fiber physical port.

The ONU 120 may collect 204 the burst profile information by continuously listening to downstream traffic from OLT on both first wavelength and second wavelength and learns necessary configuration parameters for activation.

In some example embodiments, the burst profile information may comprise an indication of a preamble sequence pattern allocated for the ONU 120. For example, the preamble sequence pattern may indicate a mapping of a set of candidate preamble sequences and indices of the set of candidate preamble sequences. Usually, the preamble sequence pattern may at least comprise a long preamble sequence and a short preamble sequence. The short preamble sequence may have the number of bits less than that of the long preamble sequence.

Then the OLT 110 may broadcast 206 a Sequence Number (SN) grant on the downstream wavelength dedicated for the ONU 120 and initiate a quiet window on the upstream wavelength dedicated for the ONU 120. In other words, ONUs receiving this SN grant structure, which has been registered at the OLT 110, will automatically suppress any data sending operations on the upstream wavelength dedicated for the ONU 120, which is a newly joined ONU.

If the ONU 120 receives the SN request from downstream wavelength dedicated for the ONU 120, the ONU 120 may response 208 the SN request with the SN of the ONU 120 on the upstream wavelength dedicated for the ONU 120.

After receiving the SN of the ONU 120, the OLT 110 may assign 210 a unique ONU-ID to the ONU 120 and initiate ranging grant on the downstream wavelength dedicated for the ONU 120 and a further quiet window on the upstream wavelength dedicated for the ONU 120 for ranging between the OLT 110 and the ONU 120. Upon receiving the ranging grant from the OLT 110, the ONU 120 may respond 212 with a ranging response on the upstream wavelength dedicated for the ONU 120. For example, the ranging response may be transmitted via Physical Layer Operations, Administration and Maintenance upstream (PLOAMu) message on the upstream wavelength dedicated for the ONU 120.

After receiving the ranging response from the ONU 120, the OLT 110 may calculate 214 the ranging results for the ONU on the common wavelength. For example, if the common wavelength refers to $\lambda_{50G}$ and the wavelength dedicated for the ONU 120 refers to $\lambda_{10G}$, the OLT 110 may calculate the ranging results for the ONU at downstream wavelength dedicated for the ONU 120 ($\lambda_{DA}$), upstream wavelength dedicated for the ONU 120 ($\lambda_{UA}$) as well as result at common downstream wavelength ($\lambda_{50Gd}$) and common upstream wavelength ($\lambda_{50Gu}$) based on the dispersion difference between $\lambda_{50Gu}$, $\lambda_{50Gd}$, $\times_{UA}$ and $\lambda_{DA}$.

Then the OLT 110 may transmit 216 the equalization delay configuration to the ONU 120 on the common wavelength. In the SN state and the ranging state, as described above, the communication between the OLT 110 and the ONU 120 may be established on the wavelength dedicated for the ONU 120. In this way, a quite window on the common wavelength for ONU activation can be avoided.

When the ranging procedure completes, the ONU 120 has been assigned with at least a default ONU-ID and an equalization delay. This means the ONU 120 can use the common wavelength in a specific time slot as allocated by the OLT 110. Therefore, the dedicated wavelength may not be required for the ONU 120 in the uplink communication.

Then an initial equalizer training procedure may be activated. In this procedure, the OLT 110 may determine configuration information, which may also be referred to as bandwidth allocation information, comprising bandwidth allocation dedicated for the ONU 120. The bandwidth allocation may be indicated by one of a serial number grant of the ONU 120, a ranging grant between the ONU 120 and the OLT 110, a request for the ONU to transmit an upstream PLOAM message or a request for the ONU to transmit a user data. The bandwidth allocation information may also comprise an indication of first target preamble sequence to be used by the ONU for an upstream transmission on the common wavelength for the initial equalizer training procedure. Hereinafter, the first target preamble sequence may be referred to as a long preamble sequence. Then the OLT 110 may transmit 216 the bandwidth allocation information to the ONU 120.

Upon receiving the bandwidth allocation information, the ONU 120 may perform 218 the upstream transmission on the common wavelength based on the indication of the first target preamble sequence obtained from the bandwidth allocation information.

In some example embodiments, in this upstream training phase, the ONU 120 may only transmit serial number message for OLT's serial number grant or a registration message for OLT's raging grant. As an option, the ONU 120 may also transmit an acknowledgement message (for OLT's request for an upstream PLOAM message).

In some example embodiments, the ONU 120 may only transmit a transmission frame with empty payload or only transmit PLOAMu messages. As a further option, the ONU 120 may also transmit client traffic data in the upstream burst if the OLT 110 may finish upstream training via an upstream burst.

Based on received burst from the ONU 120 with the first target preamble sequence, the OLT 110 may train it equalizer to an appropriate state (e.g. low bit error rate). That is, the OLT 110 may determine 220 a set of parameters for recovering an original signal transmitted from the ONU 120 on the first wavelength from a distorted signal received from the transmission.

In some example embodiments, the OLT 110 may repeat upstream training on the common wavelength and instruct the ONU 120 to use different preamble sequence until a satisfactory equalizer training result is achieved. For example, the OLT 110 may transmit a further bandwidth allocation information to the ONU 120, which may comprises an indication of a further target preamble sequence, for example, having a shorter bit than that of the previous target preamble sequence. The ONU 120 may also perform 224 a further upstream transmission based on the further target preamble sequence to the OLT. Based on the further target preamble sequence received further upstream transmission, the OLT 110 may further update the set of parameters for recovering an original signal transmitted from the ONU, until the equalizer is well-trained.

In some example embodiments, after the OLT 110 has successfully trained its equalizer, the OLT 110 may update the bandwidth allocation structure for the ONU 120 to instruct it to use a short preamble sequence.

In some example embodiments, once received the short-preamble indicator, the ONU 120 exits from training state or sub-state of operation state and enters normal operation state, thus client data traffic transmission can be started or resume.

Figure 3:
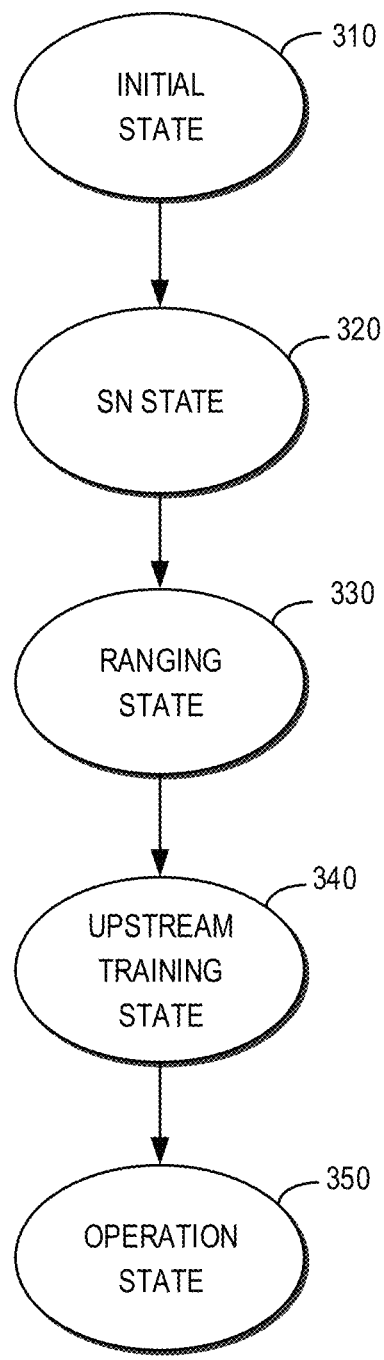
FIG. 3 shows an example of states in the ONU activation procedure according to some example embodiments of the present disclosure.

FIG. 3 shows an example of states in the ONU activation procedure according to some example embodiments of the present disclosure. The ONU activation procedure may be further described with reference to FIG. 3 as below.

In the initial state 310, the ONU 120 may learn burst profiles passively. There are two kinds of burst profiles learned by the ONU 120, categorized by whether the burst is purposed as a "training burst". Typically, the "training burst" profile is associated with a long preamble (e.g., for initial equalizer training of the OLT 110). The other burst profiles are regular burst profiles, which may be associated with relatively shorter preamble configuration.

Then the ONU 120 goes through SN state 320 and ranging state 330 and exits ranging state 330 after receiving its equalization delay configuration from OLT 110.

The ONU 120 may goes into an upstream training state 340. In this state, the ONU 120 can encapsulate user data and send them to the OLT 110 if OLT 110 can finish upstream training when it receives one upstream burst with "training burst profile". Alternatively, the ONU 120 may only send padded frames or only PLOAMu messages with preamble sequence designated by the OLT 110. After the OLT 110 finishes its equalizer training, the OLT 110 may instruct the ONU 120 to enter a normal operation state 350.

Figure 4:
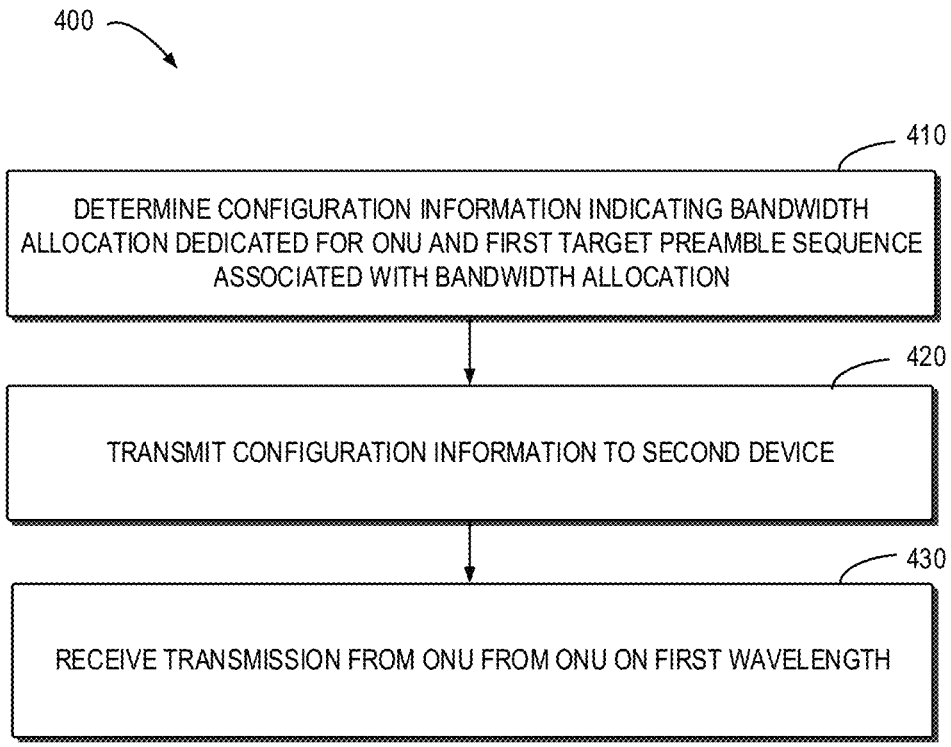
FIG. 4 shows a flowchart of an example method of ONU activation for OLT Equalizer training according to some example embodiments of the present disclosure.

FIG. 4 shows a flowchart of an example method 400 of ONU activation for OLT Equalizer training according to some example embodiments of the present disclosure. The method 400 can be implemented at the OLT 110 as shown in FIG. 1. For the purpose of discussion, the method 400 will be described with reference to FIG. 1.

At 410, the OLT 110 determines configuration information indicating a bandwidth allocation dedicated for ONU and a first target preamble sequence associated with the bandwidth allocation, the first target preamble sequence is to be used by a ONU for a transmission from the ONU to the OLT on a first wavelength.

At 420, the OLT 110 transmits the configuration information to the ONU.

At 430, the OLT 110 receives the transmission from the ONU from the ONU on the first wavelength, the transmission is performed by the ONU based on the first target preamble sequence.

In some example embodiments, the OLT 110 may determine, based on the first target preamble sequence, a set of parameters for recovering, from a distorted signal received from the transmission, an original signal transmitted from the ONU on the first wavelength.

In some example embodiments, the bandwidth allocation dedicated for the ONU is indicated by a serial number grant of the ONU, a ranging grant between the ONU and the OLT; a request for the ONU to transmit PLOAM message or a request for the ONU to transmit a user data.

In some example embodiments, the OLT 110 may further transmit, to the ONU, an indication of a preamble sequence pattern allocated for the ONU, the preamble sequence pattern indicating a mapping of a set of candidate preamble sequences and indices of the set of candidate preamble sequences.

In some example embodiments, the indication is transmitted on at least one of the first wavelength; or a second wavelength different from the first wavelength, the transmission on the first wavelength having a higher speed than on the second wavelength.

In some example embodiments, the OLT 110 may further transmit, to the ONU, further configuration information indicating a further bandwidth allocation dedicated for the ONU and a second target preamble sequence associated with the further bandwidth allocation, the second target preamble sequence being to be used by the ONU for a further transmission from the ONU to the OLT on the first wavelength, the second target preamble sequence having a shorter length than the first target preamble sequence. If the OLT determines that the further transmission from the ONU is received, the OLT may update a set of parameters for recovering, from a distorted signal received from the transmission, an original signal transmitted from the ONU on the first wavelength or recovery, from a further distorted signal received from the further transmission, a further original signal transmitted from the ONU on the first wavelength.

Figure 5:
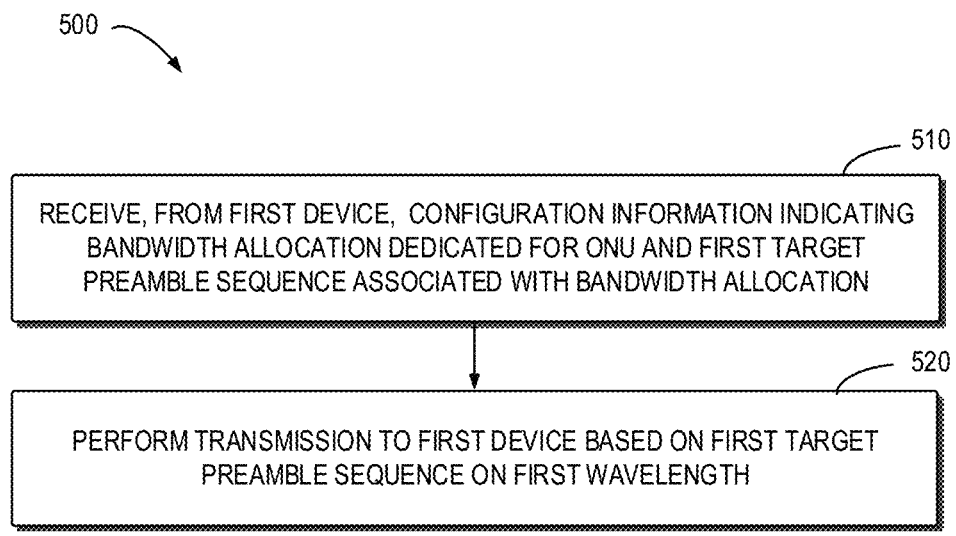
FIG. 5 shows a flowchart of an example method of ONU activation for OLT Equalizer training according to some example embodiments of the present disclosure.

FIG. 5 shows a flowchart of an example method 500 of ONU activation for OLT Equalizer training according to some example embodiments of the present disclosure. The method 500 can be implemented at the ONU 120 as shown in FIG. 1. For the purpose of discussion, the method 500 will be described with reference to FIG. 1.

At 510, the ONU 120 receives, from an OLT, configuration information indicating a bandwidth allocation dedicated for an Optical Network Unit, ONU, and a first target preamble sequence associated with the bandwidth allocation, the first target preamble sequence being to be used by the ONU for a transmission from the ONU to the OLT on a first wavelength.

At 520, the ONU 120 performs the transmission to the OLT based on the first target preamble sequence on the first wavelength.

In some example embodiments, the bandwidth allocation dedicated for the ONU is indicated by a serial number grant of the ONU, a ranging grant between the ONU and the OLT; a request for the ONU to transmit PLOAM message or a request for the ONU to transmit a user data.

In some example embodiments, the ONU 120 may transmit, to the OLT, one of a serial number message for responding the serial number grant, a registration message for responding the ranging grant; an acknowledgement message for responding the request for the ONU to transmit a Physical Layer Operations, Administration and Maintenance message; or the user data.

In some example embodiments, the ONU 120 may receive, from the OLT, an indication of a preamble sequence pattern allocated for the ONU, the preamble sequence pattern indicating a mapping of a set of candidate preamble sequences and indices of the set of candidate preamble sequences.

In some example embodiments, the ONU 120 determine an index of the first target preamble sequence from the configuration information; and determine the first target preamble sequence from the set of candidate preamble sequences based on the index and the mapping.

In some example embodiments, the indication is received on at least one of the first wavelength; or a second wavelength different from the first wavelength, the transmission on the first wavelength having a higher speed than on the second wavelength.

In some example embodiments, the ONU 120 may receive, from the OLT, further configuration information associated with a second target preamble sequence to be used by the ONU for a further transmission from the ONU to the OLT on the first wavelength, the second target preamble sequence having a shorter length than the first target preamble sequence; and perform the further transmission to the OLT based on the second target preamble sequence on the first wavelength.

In some example embodiments, an apparatus capable of performing the method 400 (for example, implemented at the OLT 110) may comprise means for performing the respective steps of the method 400. The means may be implemented in any suitable form. For example, the means may be implemented in a circuitry or software module.

In some example embodiments, the apparatus comprises means for determining configuration information associated with a first target preamble sequence to be used by a ONU for a transmission from the ONU to the OLT on a first wavelength; means for transmitting the configuration information to the ONU; and means for receiving the transmission from the ONU from the ONU on the first wavelength, the transmission is performed by the ONU based on the first target preamble sequence.

In some example embodiments, an apparatus capable of performing the method 500 (for example, implemented at the ONU 120) may comprise means for performing the respective steps of the method 500. The means may be implemented in any suitable form. For example, the means may be implemented in a circuitry or software module.

In some example embodiments, the apparatus comprises means for receiving, from a OLT, configuration information indicating a bandwidth allocation dedicated for an Optical Network Unit, ONU, and a first target preamble sequence associated with the bandwidth allocation, the first target preamble sequence being to be used by the ONU for a transmission from the ONU to the OLT on a first wavelength; and means for performing the transmission to the OLT based on the first target preamble sequence on the first wavelength, an original signal transmitted from the ONU being distorted during the transmission.

Figure 6:
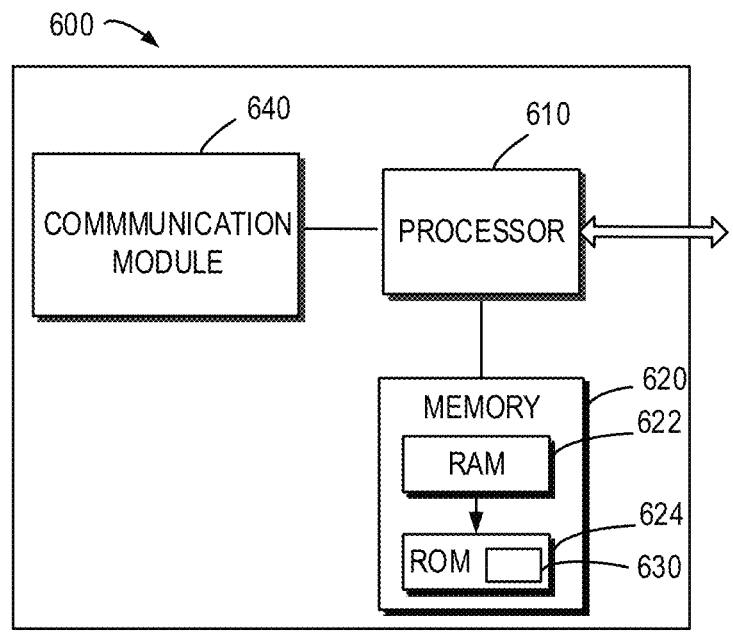
FIG. 6 shows a simplified block diagram of a device that is suitable for implementing example embodiments of the present disclosure.

FIG. 6 is a simplified block diagram of a device 600 that is suitable for implementing embodiments of the present disclosure. The device 600 may be provided to implement the communication device, for example the OLT 110 or the ONU 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 620. The processor 610 may perform any suitable actions and processing by loading the program 630 into the RAM 620.

The embodiments of the present disclosure may be implemented by means of the program 630 so that the device 600 may perform any process of the disclosure as discussed with reference to FIGS. 2-5. The embodiments of the present disclosure may also be implemented by hardware or by a combination of software and hardware.

Figure 7:
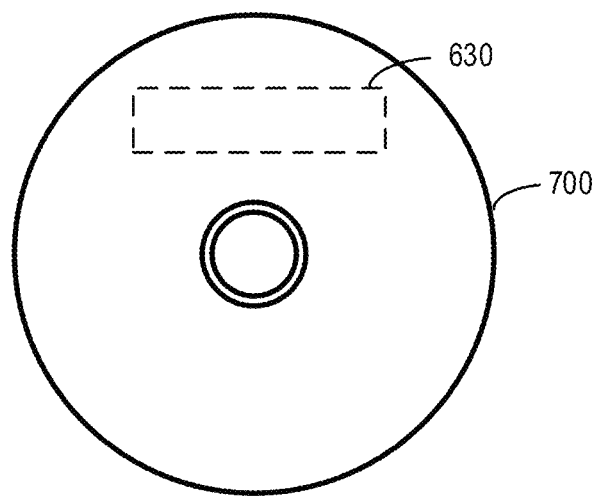
FIG. 7 shows a block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400 and 500 as described above with reference to FIGS. 4-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/ operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for an optical communication comprising:
   determining, at an Optical Line Terminal, OLT, configuration information indicating a bandwidth allocation dedicated for an Optical Network Unit, ONU, and a first target preamble sequence associated with the bandwidth allocation, the first target preamble sequence to be used by the ONU for a transmission from the ONU to the OLT on a first wavelength;
   transmitting the configuration information to the ONU; and
   receiving the transmission from the ONU on the first wavelength, the transmission is performed by the ONU based on the first target preamble sequence.

2. The method of claim 1, further comprising:
   determining, based on the first target preamble sequence, a set of parameters for recovering, from a distorted signal received from the transmission, an original signal transmitted from the ONU on the first wavelength.

3. The method of claim 1, wherein the bandwidth allocation dedicated for the ONU is indicated by one of the following:
   a serial number grant of the ONU,
   a ranging grant between the ONU and the OLT;
   a request for the ONU to transmit a Physical Layer Operations, Administration and Maintenance message, or
   a request for the ONU to transmit a user data.

4. The method of claim 1, further comprising:
   transmitting, to the ONU, an indication of a preamble sequence pattern allocated for the ONU, the preamble sequence pattern indicating a mapping of a set of candidate preamble sequences and indices of the set of candidate preamble sequences.

5. The method of claim 4, wherein the indication is transmitted on at least one of the following:
   the first wavelength; or
   a second wavelength different from the first wavelength, the transmission on the first wavelength having a higher speed than on the second wavelength.

6. The method of claim 1, further comprising:
   transmitting, to the ONU, further configuration information indicating a further bandwidth allocation dedicated for the ONU and a second target preamble sequence associated with the further bandwidth allocation, the second target preamble sequence to be used by the ONU for a further transmission from the ONU to the OLT on the first wavelength, the second target preamble sequence having a shorter length than the first target preamble sequence; and
   in accordance with a determination that the further transmission from the ONU is received, performing at least one of the following,
      updating a set of parameters for recovering, from a distorted signal received from the transmission, an original signal transmitted from the ONU on the first wavelength; and
      recovering, from a further distorted signal received from the further transmission, a further original signal transmitted from the ONU on the first wavelength.

7. A device for optical communication comprising:
   at least one processor; and
   at least one memory including computer program codes;
   the at least one memory and the computer program codes are configured to, with the at least one processor, cause the device at least to perform the method of claim 1.

8. A non-transitory computer readable medium comprising program instructions, which when executed by a processor, cause an apparatus including the processor to perform at least the method of claim 1.

9. A method for an optical communication comprising:
   receiving, at an Optical Network Unit, ONU and from an Optical Line Terminal, OLT, configuration information indicating a bandwidth allocation dedicated for the ONU, and a first target preamble sequence associated with the bandwidth allocation, the first target preamble sequence to be used the ONU for a transmission from the ONU to the OLT on a first wavelength; and
   performing the transmission to the OLT based on the first target preamble sequence on the first wavelength.

10. The method of claim 9, wherein the bandwidth allocation dedicated for the ONU is indicated by one of the following:

a serial number grant of the ONU, a ranging grant between the ONU and the OLT;

a request for the ONU to transmit a Physical Layer Operations, Administration and Maintenance message, or a request for the ONU to transmit a user data.

11. The method of claim 10, wherein performing the transmission comprises:

transmitting, to the OLT, one of the following, a serial number message for responding the serial number grant;

a registration message for responding the ranging grant;

an acknowledgement message for responding the request for the ONU to transmit a Physical Layer Operations, Administration and Maintenance message; or the user data.

12. The method of claim 9, further comprising:

receiving, from the OLT, an indication of a preamble sequence pattern allocated for the ONU, the preamble sequence pattern indicating a mapping of a set of candidate preamble sequences and indices of the set of candidate preamble sequences.

13. The method of claim 12, further comprising:

determining an index of the first target preamble sequence from the configuration information; and determining the first target preamble sequence from the set of candidate preamble sequences based on the index and the mapping.

14. The method of claim 12, wherein the indication is received from at least one of the following:

the first wavelength; or a second wavelength different from the first wavelength, the transmission on the first wavelength having a higher speed than on the second wavelength.

15. The method of claim 9, further comprising:

receiving, from the OLT, further configuration information indicating a further bandwidth allocation dedicated for the ONU and a second target preamble sequence associated with the further bandwidth allocation, the second target preamble sequence to be used by the ONU for a further transmission from the ONU to the OLT on the first wavelength, the second target preamble sequence having a shorter length than the first target preamble sequence; and performing the further transmission to the OLT based on the second target preamble sequence on the first wavelength.

16. A device for optical communication comprising:

at least one processor; and at least one memory including computer program codes;

the at least one memory and the computer program codes are configured to, with the at least one processor, cause the ONU at least to perform the method of claim 9.

17. A non-transitory computer readable medium comprising program instructions, which when executed by a processor, cause an apparatus including the processor to perform at least the method of claim 9.

* * * * *

UNITED STATES PATENT AND TRADEMARK OFFICE
CERTIFICATE OF CORRECTION

| | |
|---|---|
| PATENT NO. | : 11,515,944 B2 |
| APPLICATION NO. | : 17/488918 |
| DATED | : November 29, 2022 |
| INVENTOR(S) | : Chenhui Ye et al. |

It is certified that error appears in the above-identified patent and that said Letters Patent is hereby corrected as shown below:

In the Claims

Column 12, Line 55, Claim 9 should read:
--9. A method for an optical communication comprising: receiving, at an Optical Network Unit, ONU and from an Optical Line Terminal, OLT, configuration information indicating a bandwidth allocation dedicated for an the ONU, and a first target preamble sequence associated with the bandwidth allocation, the first target preamble sequence to be used by the ONU for a transmission from ONU to the OLT on a first wavelength; and performing the transmission to the OLT based on the first target preamble sequence on the first wavelength.--

Signed and Sealed this
Thirtieth Day of May, 2023

Katherine Kelly Vidal
*Director of the United States Patent and Trademark Office*